US007436675B2

(12) United States Patent
Rimmer et al.

(10) Patent No.: US 7,436,675 B2
(45) Date of Patent: Oct. 14, 2008

(54) CONSTANT CURRENT CLASS 3 LIGHTING SYSTEM

(75) Inventors: Philip John Rimmer, London (GB); Carole Frances Sherrington, South Woodham Ferrers (GB)

(73) Assignee: Juno Manufacturing, Inc., Des Plaines, IL (US)

( * ) Notice: Subject to any disclaimer, the term of this patent is extended or adjusted under 35 U.S.C. 154(b) by 52 days.

(21) Appl. No.: 11/384,765

(22) Filed: Mar. 20, 2006

(65) Prior Publication Data

US 2007/0024211 A1 Feb. 1, 2007

Related U.S. Application Data

(62) Division of application No. 10/799,741, filed on Mar. 12, 2004, now Pat. No. 7,038,400.

(51) Int. Cl.
*H05K 1/00* (2006.01)
(52) U.S. Cl. ............... 361/749; 361/785; 174/15.5; 174/15.6; 174/254
(58) Field of Classification Search ........... 174/41, 174/106, 106 R, 115, 113 R; 315/224, 291, 315/307
See application file for complete search history.

(56) References Cited

U.S. PATENT DOCUMENTS

| 3,297,814 | A | * | 1/1967 | McClean et al. ........... 174/41 |
| 5,956,445 | A | * | 9/1999 | Deitz et al. ........... 385/100 |
| 6,452,344 | B1 | * | 9/2002 | MacAdam et al. ........ 315/307 |
| 2006/0160402 | A1 | * | 7/2006 | Kowalski et al. .......... 439/397 |

OTHER PUBLICATIONS http://web.archive.org/web/20030626210137/http://www-ee.eng.hawaii.edu/~msmith/ASICs/HTML/Problems/asp02/SingleAns/asp0201.htm—archived on http://www.archive.org/index.php, on Jun. 26, 2003.*
http://web.archive.org/web/20030609061057/http://members.misty.com/don/f-lamp.html—archived on http://www.archive.org/index.php, Jun. 9, 2003.*
http://web.archive.org/web/20030701122743/http://www.enjoythemusic.com/Magazine/viewpoint/0603/aachapter45.htm—archived on http://www.archive.org/index.php, Jul. 1, 2003.*
http://web.archive.org/web/20030429030902/http://lightingdesignlab.com/commercial/articles/THD.htm—archived on http://www.archive.org/index.php, Apr. 29, 2003.*
Sam's F-Lamp FAQ, Fluorescent Lamps, Ballasts, and Fixtures☐☐Principles of Operation, Circuit, Troubleshooting, Repair, Version 1.90☐☐Copyright (C) 1994, 1995, 1996, 1997, 1999☐☐Samuel M. Goldwasser.*

* cited by examiner

*Primary Examiner*—Tuan T Dinh

(57) ABSTRACT

A flexible cable is provided for a lighting system having a power supply that includes a power supply input to receive a first signal having a first frequency and a circuit for converting the first signal to a second signal, and at least one luminaire coupled to a lamp driver. The cable comprises a first leg of wires for carrying the second signal. The first wire electrically connects a loop output of the power supply to an input of the lamp driver and a second wire electrically connects an output of the lamp driver to a loop return of the power supply. The cable further comprises a second leg of wires electrically connected to a ground of the power supply and the ground of the lamp driver. The second signal has a substantially constant current and a second frequency distinctly higher than the first frequency. The flexible cable further comprises a modular connector.

20 Claims, 14 Drawing Sheets

| Fig. 6A | Fig. 6B |

| Fig. 8A | Fig. 8B |

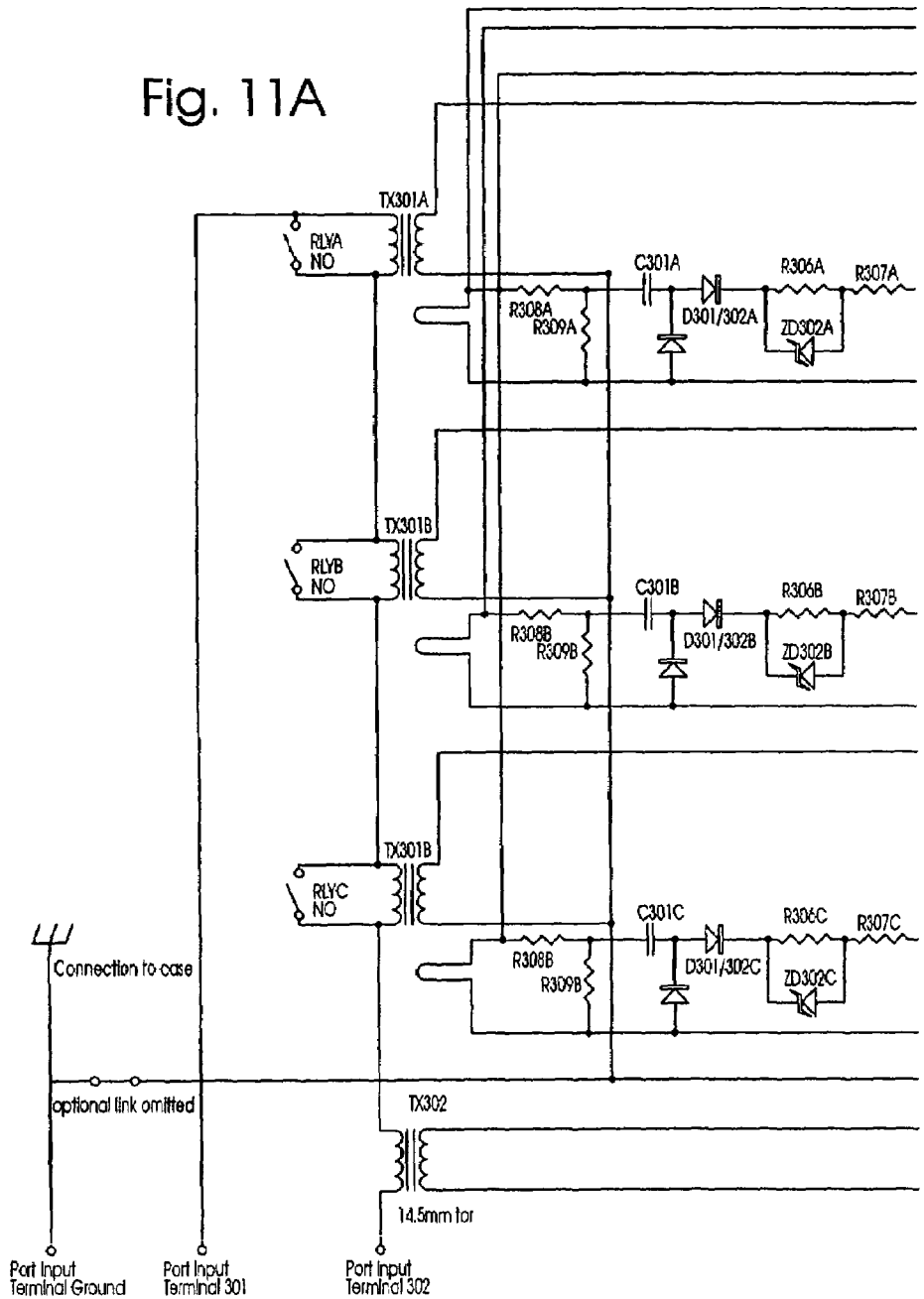

CONSTANT CURRENT CLASS 3 LIGHTING SYSTEM

CROSS REFERENCE TO RELATED APPLICATIONS

This is a division of U.S. application Ser. No. 10/799,741, filed on Mar. 12, 2004, now U.S. Pat. No. 7,038,400 which is incorporated herein by reference to the extent permitted by law.

BACKGROUND

The National Electrical Code defines three classes of circuits and provides specific installation requirements for each. In general, Class 2 is defined as any circuit that provides 30V or less at 100 VA. Class 3 is defined as any circuit that provide up to 150V at 100 VA. Class 1 may then be used to classify circuits that provide output that is not power limited.

Lighting systems typically consist of permanently wired-in lighting fixtures, with each lighting fixture obtaining its power directly from a regular Class 1 power line. As a regular power line is not power limited and is considered large enough to be a fire-hazard, the National Electrical Code classifies traditional lighting systems as Class 1 circuits and thus requires numerous protective measures. For example, traditional lighting systems are required by the National Electrical Code to have electrical conductors that are installed in the form of armored cable or within steel conduits.

FIGS. 1 and 2 depict two traditional lighting systems. FIG. 1 shows a traditional lighting system having six troffers 102 connected in parallel to each other. Each troffer typically includes a ballast (not shown) and is connected to a junction box 104 by a whip Each junction box 104 is then connected to an ordinary power outlet 108 via conduit wire that is housed within a steel conduit 110.

FIG. 2 shows another traditional lighting system having three recessed light fixtures 202 connected in series. In this traditional lighting system, each recessed light fixture 202 includes a junction box 204 associated with each fixture and connected to the fixture via a whip 206. As in the system of FIG. 1, each junction box is then connected to an ordinary power outlet via conduit wire that is housed within a steel cable.

These and other traditional lighting systems have numerous drawbacks. First, by delivering a line voltage to each fixture, traditional lighting systems provide a shock hazard and thus present a significant danger during installations. In addition, components such as steel conduit and whips, which are required in Class 1 systems for safety measures, are both costly and inflexible. For example, installation of steel conduit around obstructions can be time-consuming, and any last-minute reconfigurations may become very cumbersome.

A solution to many of the problems associated with traditional lighting systems was introduced by Ole Nilssen in U.S. Pat. No. 4,626,747. Specifically, the Nilssen patent disclosed a lighting system capable of complying with Class 3 power requirements. The Class 3 lighting system includes a power supply capable of being connected to an ordinary power line and converting the non-power limited, low-frequency power line voltage to a power-limited, high-frequency voltage. The Class 3 lighting system also includes a light fixture capable of being connected to the power supply in a location that may be remote from the power supply. Because of the Class-3 output characteristics of the power supply units, the amount of available power in the Nilssen patent was limited to a level considered acceptably safe from a fire initiation viewpoint, yet adequate in power to provide ample light from a fluorescent lighting fixture (e.g. 100 Watts).

By using a Class 3 power supply that mounts remotely from the fixture, the lighting system disclosed in the Nilssen patent eliminates the need for steel conduits, whips and other associated components necessary for traditional Class 1 lighting systems, reduces material expenses and management/inventory costs, and virtually eliminates trade conflict callbacks. Due to the high-frequency operation of the Nilssen Class 3 system, the lamp transformer within each fixture could be small and light weight. Combining this miniaturized transformer with the reduced fixture/structural requirements, due to the Class-3 characteristics, permits the lighting fixtures to be particularly compact and light-of-weight. Furthermore, because of their Class-3 nature, the fixtures in the Nilssen lighting system may also be considered as ordinary portable (plug-in) lighting products; which implies that they may be installed, moved, removed, and/or exchanged by unskilled persons.

However, the Nilssen lighting system did not provide a complete answer. Specifically, the power supply output disclosed in the Nilssen patent was controlled by providing a constant voltage while limiting the output current. This approach results in a significant voltage drop along transmission cables causing the output of a lamp to vary significantly depending on its distance from the power supply. In addition, fixtures designed to operate with the constant voltage power supply disclosed in the Nilssen patent require matching tank circuits, which may increase both the cost and complexity of the lamp driver circuits.

SUMMARY OF THE INVENTION

The present invention is a flexible cable for a lighting system having a power supply and at least one luminaire. The flexible cable is connected between at least one output of the power supply and the at least one luminaire, which is coupled to at least one lamp driver. The power supply includes a power input for receiving a first signal having a first frequency, and a circuit for converting the first signal to a second signal.

According to one aspect, the flexible cable comprises an insulated non-polarized twisted pair of wires for carrying the second signal, and an insulated single wire. A first wire of the twisted non-polarized pair of wires is electrically connected between a loop output of the power supply and a loop input of the lamp driver, and a second wire of the twisted pair is electrically is electrically connected between a loop output of the lamp driver and a loop return of the power supply. The uninsulated wire is electrically connected to a ground of the power supply and a ground of the lamp driver.

The flexible cable is a plenum rated Class 3 cable. The uninsulated wire includes a 14 AWG ground and the twisted pair of wires includes an 18 AWG twisted pair. The insulated and uninsulated wires may be enclosed in a common jacket.

Each flexible cable is also preferably terminated using a self-locking connector to allow for easy modular connection between components of the lighting system. This modular connectivity provides for easier installation as well as increased flexibility in the reconfiguration and relocation of lighting fixtures.

According to another aspect, the power supply is designed to physically mount to a junction box and to convert the ordinary power line signal (typically 60 Hz@120V or 277V) to a high frequency output signal (for example, 48 kHz). The flexible cable provides the output of the power supply at a substantially constant current level. In addition, the power supply also includes circuitry to ensure that the power supply output signal is power limited to 100 VA. As the output current is maintained constant, the output voltage is then controlled in accordance with the connected load in order to comply with the power limit requirement.

According to another aspect, the at least one lamp driver is mounted to a fixture and configured to receive the high-frequency output signal from the power supply. The lamp driver then uses the power signal provided via the flexible cable to operate one or more lamps. Each lamp driver may include circuitry configured to operate a specific lamp type. For example, lamp drivers may be configured to operate either incandescent, fluorescent, or other type lamps. In addition, each lamp driver may also be connected to the power converter either in parallel or in series.

In comparison to traditional Class 1 lighting systems, the present invention results in electrical energy savings, reduced labor, lowered costs, and additional safety by eliminating the need to run the power line voltage to each light fixture. In addition, unlike previously known high-frequency Class 3 lighting systems, the constant current power supply allows for equal light output regardless of cable length and eliminates the need for expensive matching circuitry in the lamp driver. Lastly, the heat dissipation focused at the power supply can be flexibly located within a building ceiling spaces away from the fixture to reduce the load demands of the HVAC system.

DETAILED DESCRIPTION

The present invention is a lighting system having a power supply, at least one luminaire, and a flexible cable for connecting the power supply to the luminaires. The power supply preferably includes a power supply input to receive a power line signal, a circuit to convert the power line signal to a substantially constant-current, high-frequency signal, and a power supply output to output the substantially constant-current, high-frequency signal. Each luminaire also preferably includes a lamp, a housing to hold the lamp, luminaire input to receive the high-frequency signal from the power supply, and a lamp driver circuit configured to use the received output signal to operate the lamp.

Figure 1:
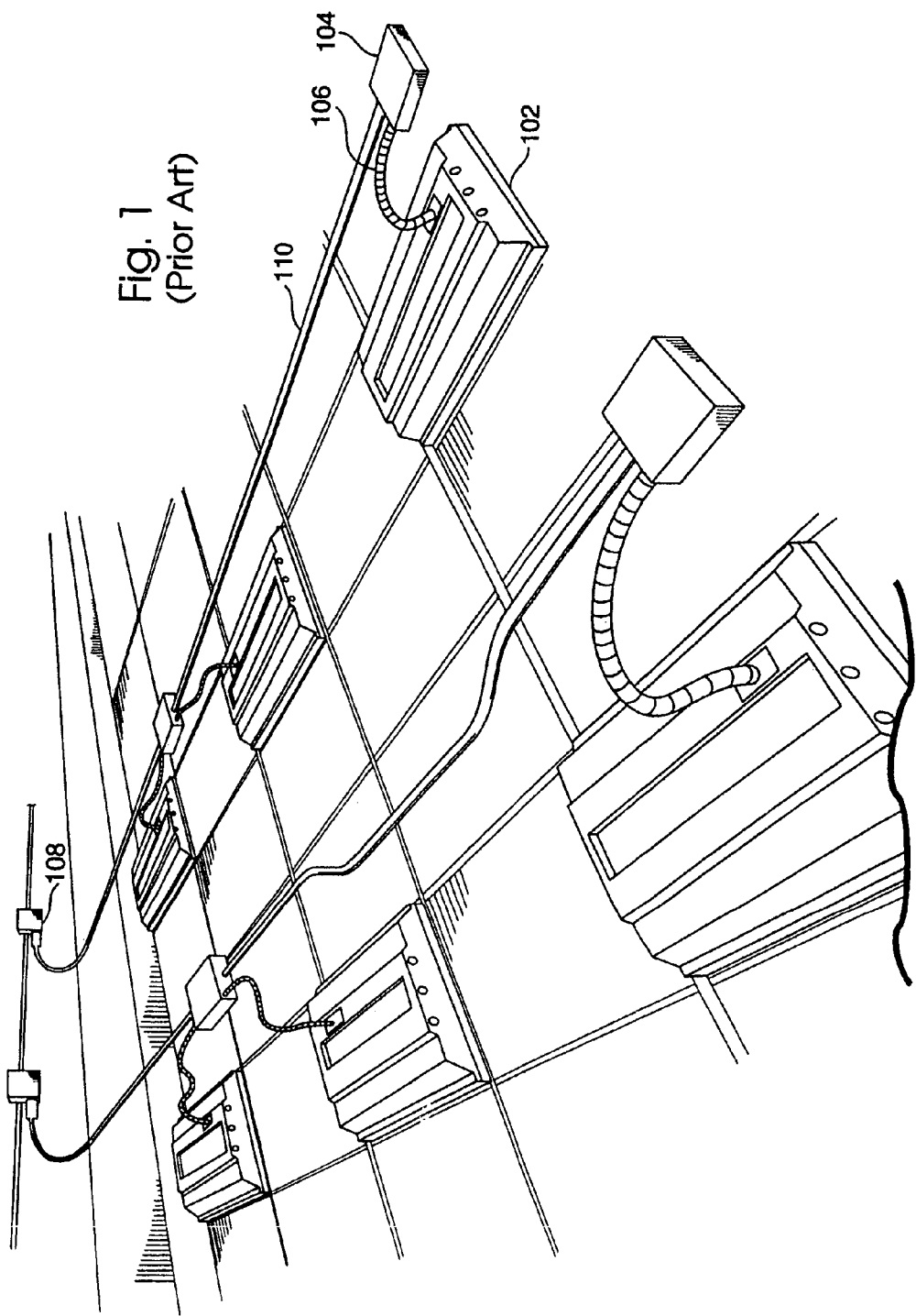
FIG. 1 shows a prior art lighting system.
Figure 2:
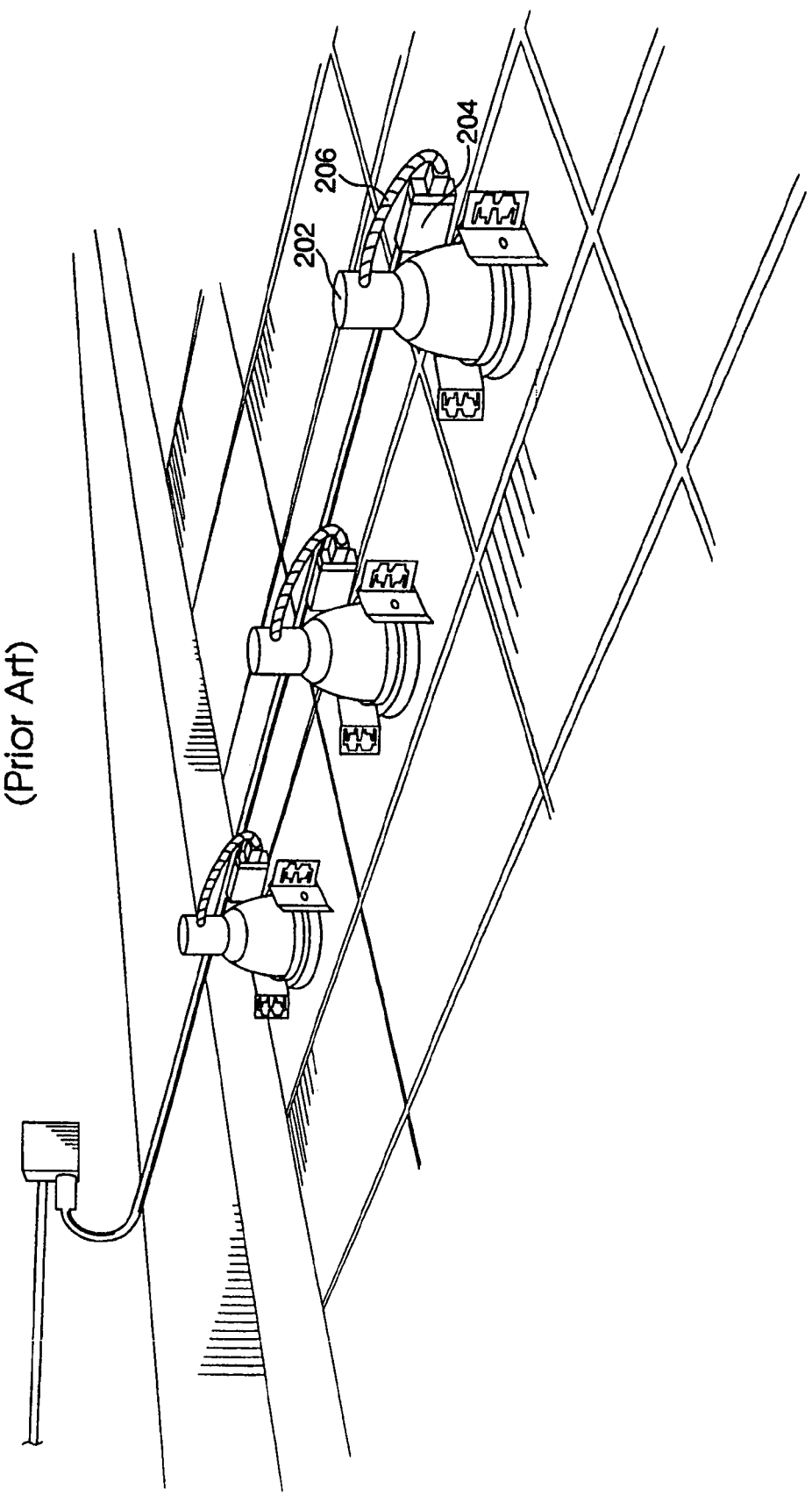
FIG. 2 shows another prior art lighting system.
Figure 3:
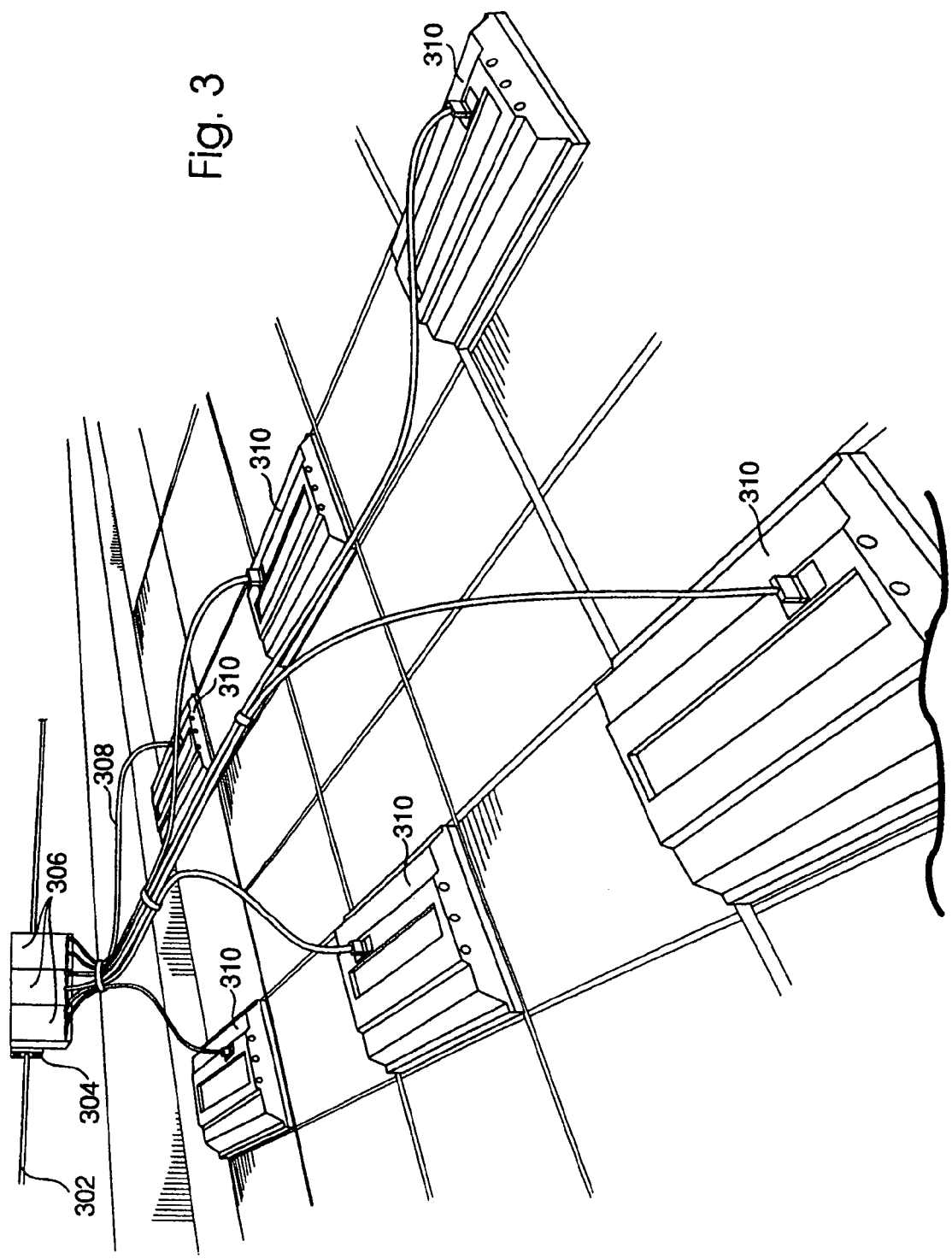
FIG. 3 shows a lighting system according to the present invention.

FIG. 3 shows one exemplary embodiment of the lighting system. In this embodiment, a junction box 304 is supplied with a power line signal (typically, either a 60 Hz@120V or 277V signal) through a pair of power line conductors and a safety ground via a steel armored conduit 302. In the depicted example, two power supplies 306 are mounted to the junction box 304 so that each power supply 306 is operably connected to receive the power line signal and connected safety ground. It should also be understood that instead of physically mounting the power supply to a junction box, the power supply may instead be configured to receive a power line signal from an ordinary power outlet via a standard male power plug.

Each power supply 304 includes an output 306 for outputting the substantially constant current, high-frequency signal. By using this high frequency signal, the power supply can be used to operate a luminaire that is mounted in a remote location from the power supply. For example, the luminaire may be mounted more than 20 feet from the power supply.

The output from each power supply unit is also power-limited to a maximum of 100 Volt-Ampere in accordance with specifications for Class-3 circuits (as defined by the National Electrical Code) and can therefore be installed without conduit and connected to a luminaire by way of a plug-in lightweight flexible two-wire electric connect cord. Thus, as shown in FIG. 3, each output port is connected via a flexible cable 308 to a lamp driver (not shown in FIG. 3) located within a respective one of the troffers 310. Although the power supplies are shown with two output ports, the power supply may alternatively include only a single output port or more than two output ports.

Each output port in the power supply is also preferably configured to physically receive and disconnectably connect electrically to a modular connector at one end of the flexible cable. The other end of the cable also preferably includes a modular connector configured to be physically and electrically received by one of the luminaires. Due to the modular connection, the power supplies and luminaire may be easily disconnected and reconnected in order to allow for quicker installation, reconfiguration, and replacement of components.

Figure 4:
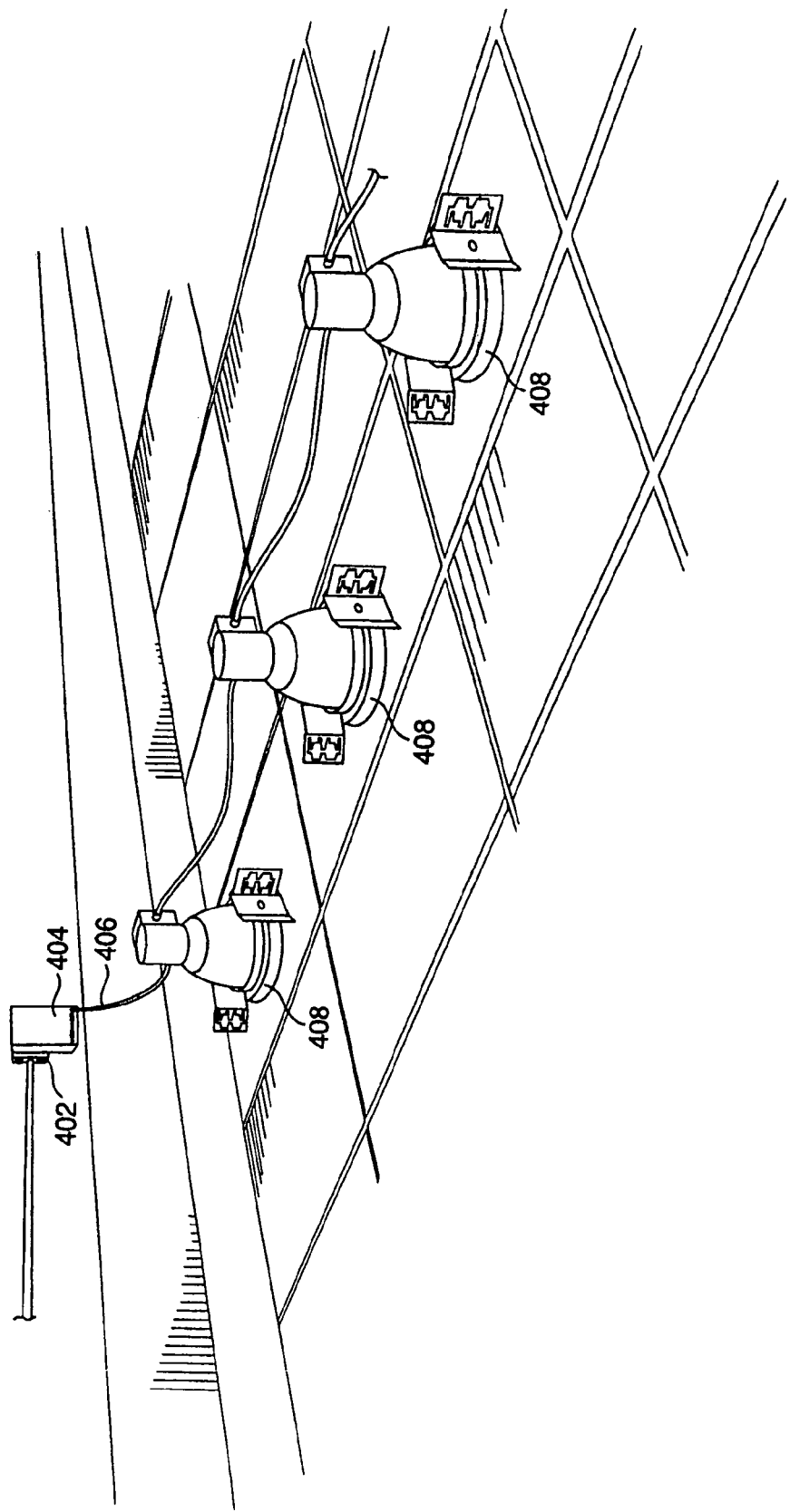
FIG. 4 shows another lighting system according to the present invention.

FIG. 4 shows another exemplary embodiment of the lighting system. In this embodiment, a single power supply 404 is similarly connected to a junction box 402 to receive a power line signal. The power supply 404 is then connected, via a flexible cable 406, to three recessed lights 408. Each recessed light 408 includes a lamp driver mounted to the fixture housing. The lamp driver may include as many as two ports, each of which is capable of disconnectably receiving the flexible cable. Each of these ports can be used either as an input port or an output port. Accordingly, unlike the embodiment shown in FIG. 3 where each of the luminaires is connected to the power supply in parallel (i.e. each luminaire is connected to a respective output port in the power supply), each of the luminaires shown in FIG. 4 is capable of being connected in series to one another. Therefore, in this embodiment, it is possible to operate multiple luminaires from a single output port from the power supply. The specific number of luminaires that can be connected in series is based on the wattage of the lamp in each respective luminaire and the power output from the power supply. For example, a 100W power supply output may be used to power two 42W lamps in series or three 26W lamps in series.

As noted above, the output from the power supply in the present invention is a substantially constant-current output signal. Accordingly, the current of the output signal remains relatively unchanged throughout a specific load impedance range. For purposes of this description, "substantially constant" means the magnitude of the rms current varies less than 10% between short circuit and full load. In fact, ideally the only real deviation between short circuit, fully loaded, and fully loaded with cable included is to the waveshape of the current. The short circuit current waveshape tends to be triangular, reflecting the inductive nature of the driving impedence, while adding load via lamps drivers, cable inductance and capacitance tends to be a filtered sinusoidal current.

The magnitude of the constant-current output from the power supply may be chosen depending on the specific application and design. Preferably, for a Class 3 system, the current is between approximately 0.67 $Amps_{rms}$ and 3.3 $Amps_{rms}$.

In one embodiment, the constant current output is designed to be 1.3 $Amps_{rms}$ and the power supply is configured to operate with load impedances from 0 to 50 ohms. Under this embodiment, loading the loop with impedances between 0 and 58 ohms could cause the output voltage to vary from $0V_{rms}$ to $75V_{rms}$, and thus vary the output power from 0 VA to 100 VA, respectively. Accordingly, the power output of the power supply would range from an essentially 0 VA short circuit, through the 100 VA maximum load for a Class 3 circuit.

Any impedance conditions greater than 58 Ohms, (including open circuit), attempting to push output voltage greater than $75V_{rms}$, and power greater than 100VA are then power limited to ensure compliance with Class 3 requirements. This power limitation be accomplished in three different ways. In a first method, the power supply input may be fused. Faults internal to the power supply or externally applied to a port would then limit the power supply's ability to absorb power from the input line and deliver it to the output. Various fuse methodologies may be used. In a second method, an active electronic circuit may be configured to monitor the port output and to then trigger a short circuit of the output transformer, thus disabling the output providing a "voltage fuse" characteristic.

In a third method, the overall electronic semiconductor and output transformer designs may provide an "Inherent Limiting" type protection as is commonly used in electronic ballast technology. In this approach, the power semiconductor junctions may be selected to begin breakdown at 150° C., leading to their failure, which can either disable open a power circuit or a protective fuse. Alternatively or additionally, the transformers may be selected and placed in the circuit to inherently limit power as the wire becomes substantially more resistive due to heating. Of course, while the power limitation circuitry is preferably located in the power supply, it may also be located within other system components. For example, power limitation methods similar to those described above may be located in the luminaire instead of the power supply. A fuse may also be operably located in the flexible cable.

Figure 5:
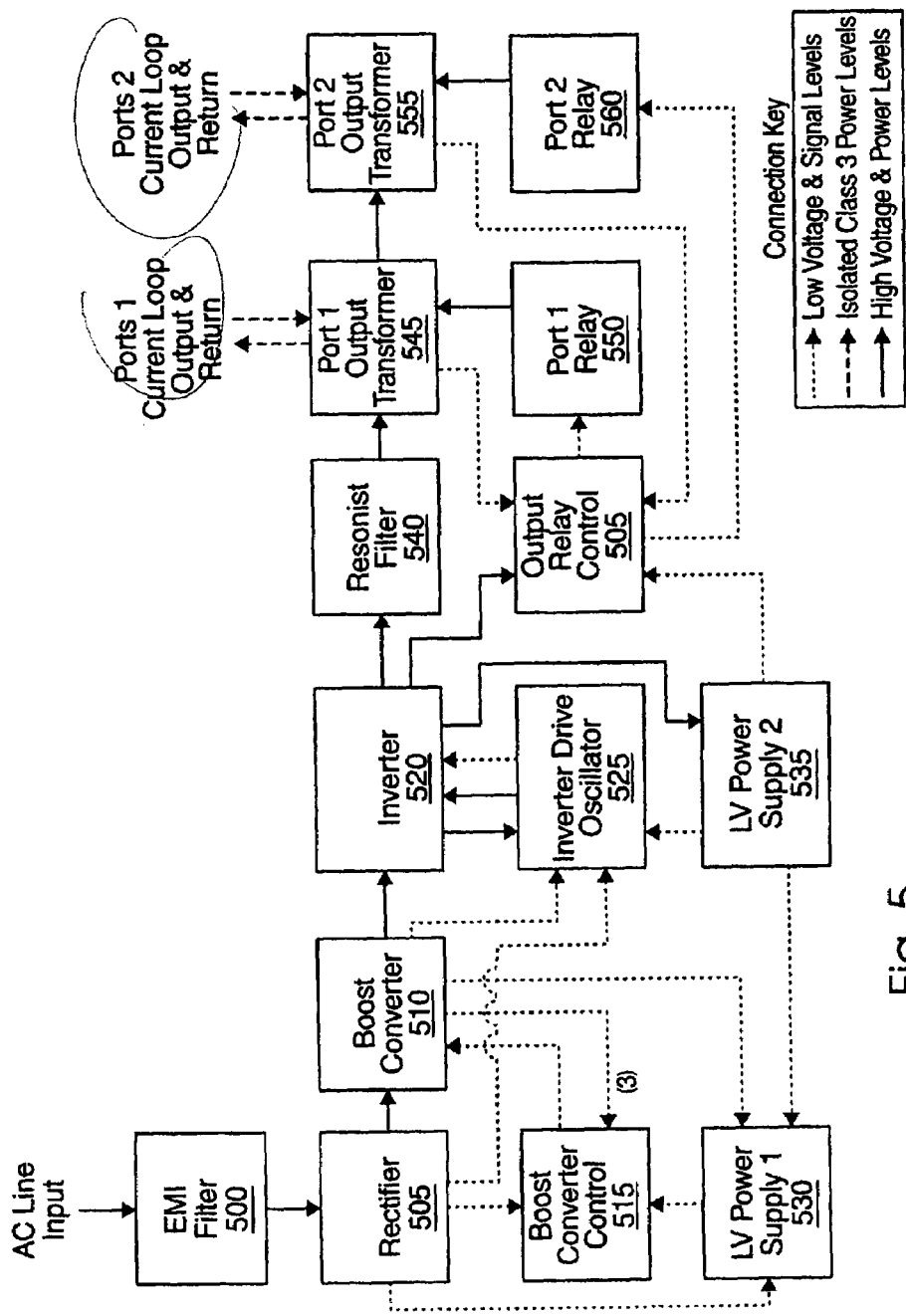
FIG. 5 shows a block diagram of one embodiment of a power supply.
Figures 6, 6A:
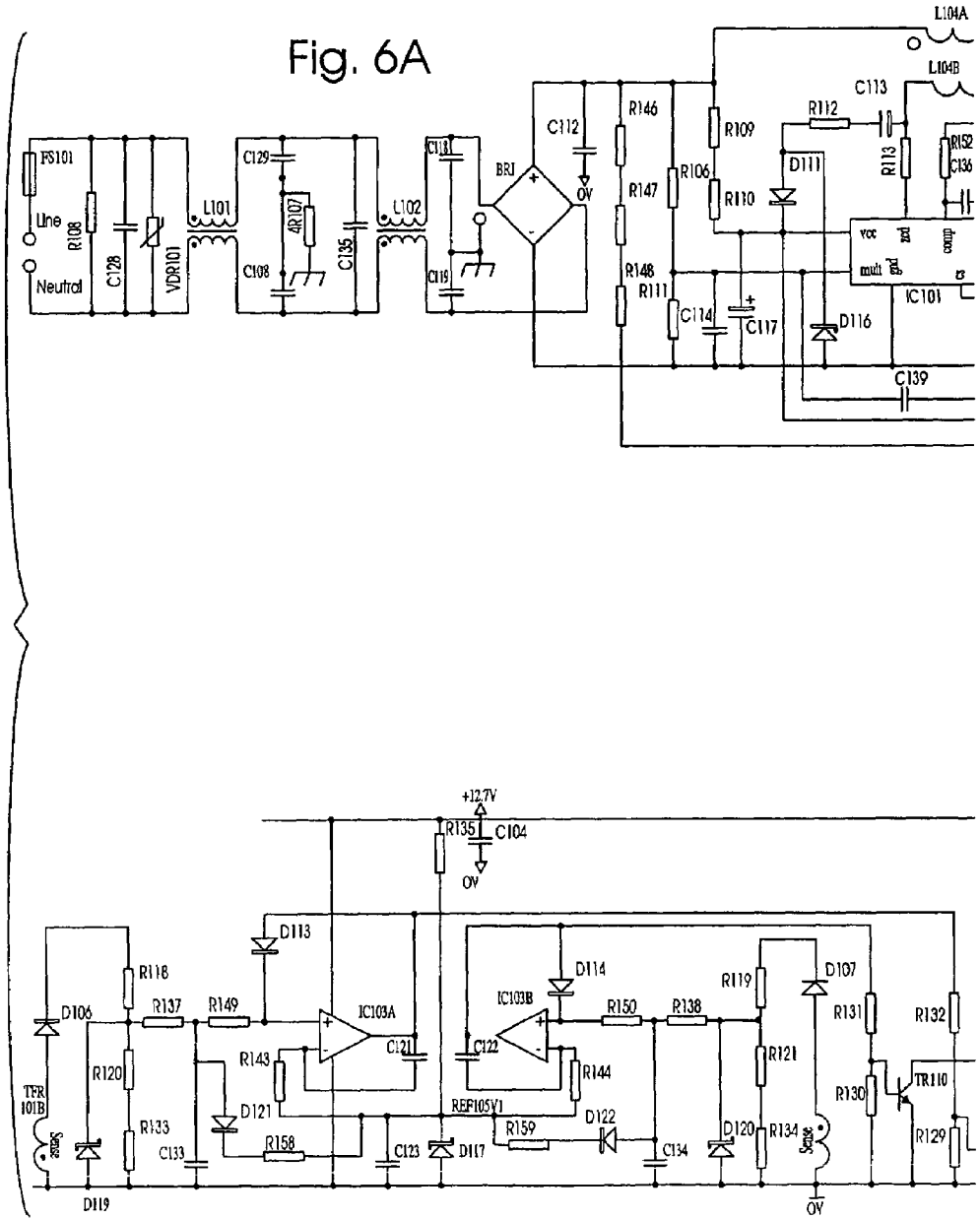
FIG. 6 is a circuit diagram of one embodiment of the power supply.
Figure 6B:
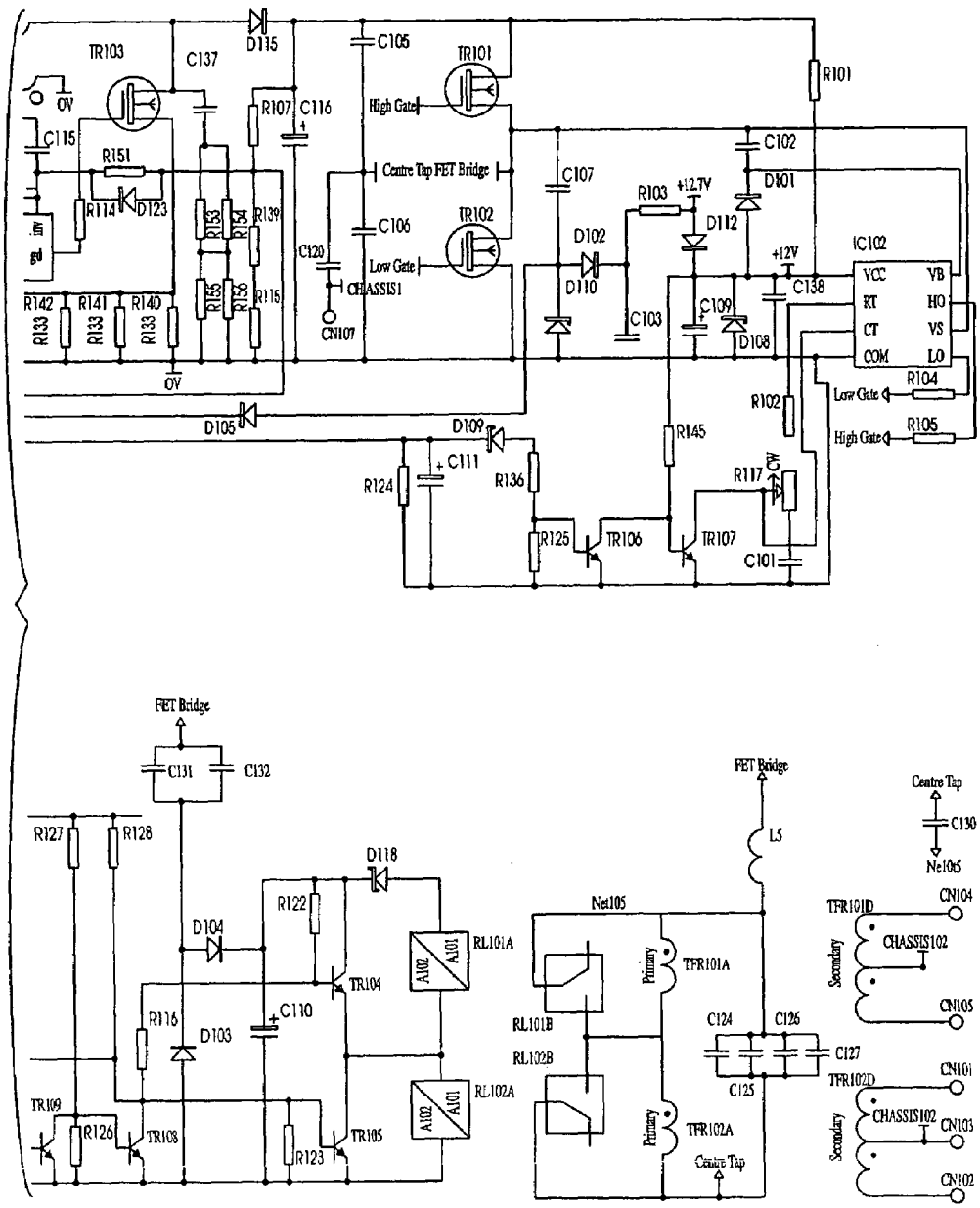

FIG. 5 and 6 show a block diagram and a circuit diagram, respectively, of one exemplary embodiment of a power supply having two output ports. In this embodiment, the power supply includes a first filter 500, a rectifier circuit 505, a boost converter 510, a boost converter control 515, an inverter 520, an inverter drive oscillator 525, a first LV ("low voltage") power supply 530, a second LV power supply 535, a second filter 540, a first port output transformer 545, a first port relay 550, a second port output transformer 555, a second port relay 560, and an output relay control 565. For purposes of the block diagram of FIG. 5 (as well as those of FIGS. 7 and 10 discussed below), solid lines between blocks represent high voltage and power levels, dotted lines represent low voltage and signal levels, and dashed lines represent isolated class 3 power levels.

The first filter 500 is preferably a 2-Stage EMI filter for minimizing both common and differential mode interference from being conducted out on the input conductor connections. In one embodiment, the 2-Stage EMI Filter has one power input for receiving the AC power line signal and one power output to the rectifier circuit 505.

As shown in FIG. 6, the input fuse FS101 is the first main component of the filter and is in series with the line voltage connection. The fuse FS101 is followed by the first stage of the EMI filter. It consists of a surge arrester VDR101, a Class X capacitor C128, and a bleeder resistor R108 in parallel from fused line to neutral. Both line and neutral are then series connected through a common-mode choke L101. The common-mode choke L101 is followed by two Class Y capacitors C108 and C129 from filtered line and neutral, respectively, through damping resistor R157 to the ground. The second stage of the EMI filter begins with a Class X capacitor C135 from line to neutral. Class X capacitor C135 is then followed with another common-mode choke L102. The second stage is completed with two Class Y filter capacitors C118 and C119 from the filtered line and neutral to ground.

The rectifier circuit 505 preferably has one main power input for receiving the signal from the filter 500, one main power output to the boost converter 510. The rectifier circuit 505 also has three low voltage resistor feeds to the inverter drive oscillator 525, the boost converter control 515 and the first LV power supply 530.

As shown in FIG. 6, the rectifier circuit includes a bridge rectifier BR1 to convert sinusoidal voltages on the filtered line and neutral into a full-wave rectified line of pulsating DC supply. Preferably, the bridge rectifier has a near unity power factor (PF) and a low total harmonic distortion (THD) of less than 10%. In the preferred embodiment, Sections 505, 510, 515 & 530 are responsible for insuring that the power supply has a low THD and appears essentially resistive to the power line. Accordingly, the rectified line voltage appears as a haversine waveform rectified with respect to circuit ground. The rectifier circuit 505 also includes a resistor R106 that functions as the upper end of a voltage divider for sensing the relatively high voltage rectified line to be fed to the boost converter control 525. Resistors R109 and R110 are in series and fed to the first LV power supply 530. Resistors R109 and R110 assist the starting of the controller in the boost converter control 525 through the first LV power supply 530. Resistors R146, R147 and R148 are the upper-end of a voltage divider for feeding a low-input voltage sense signal to the Inverter Drive Oscillator. Filter capacitor C112 mildly filters the higher frequency noise on the pulsating DC. Filter capacitor C112 also acts as a tanking capacitor for the frequency range of operation required to perform the power factor correction, yet does not appreciably affect the waveform shape of the low frequency haversine wave.

The Boost Converter 510 does the initial power processing in the power supply. The Boost Converter 510 has one main power input for receiving power from the rectifier circuit 505 and one main power output to the inverter. The Boost Converter 510 also includes one signal input from the boost converter control 515, and three signal outputs: the first is LV Power Supply 1 output, the second is the Inverter Drive Oscillator output, and the third is signal output to the boost converter control. The third signal output includes three different sense signals for controlling the boost converter, as discussed below.

In the embodiment shown in FIG. 6, the Boost Converter 510 consists of fourteen components. Winding L104A of the boost inductor L104 is fed from the rectified line to the junction of the Fet transistor TR103 drain lead and the rectifier diode D115 anode, which perform the boost function by the controlled switching of the boost transistor, the coincident storing of energy in the boost inductor, and the delivery of higher switch frequency pulse voltage than the low frequency rectified input pulse voltage, all via the boost rectifier.

FET transistor switching speed is strictly limited by a snubber network consisting of capacitor C137 and resistors R163, R164, R165 and R166. The FET transistor source lead also feeds through a parallel combination of three resistors R140, R141 and R142, which produce a first sense signal sent to the Boost Converter Control 515. Another resistor R107 is the upper end of a voltage divider for sensing the boosted DC output voltage for feedback processing by the controller in the Boost Converter Control, and produces a second sense signals sent to the Boost Converter Control. Lastly, winding L4B of the boost inductor performs two functions. Winding L104B supplies a third sense signal to the controller of the Boost Converter Control block. Winding L104B also supplies a low voltage drive for the first LV Power Supply.

The boost rectifier also feeds an energy storage aluminum electrolytic bulk capacitor C116 to smooth the boosted pulse voltage into a DC voltage. Resistor R1 assists in starting the half-bridge inverter drive oscillator IC. In addition, the boost inductor is fitted with a thermal fuse. If the inductor exceeds a designated temperature, the thermal fuse—which is preferably wound into the coil of the inductor—will open circuit the boost inductor. As such, the inductor-fuse combination is an active limiter of power through the converter.

The first LV power supply 530 and the second LV power supply 535 are low voltage power sources for signal circuitry. The main function of the first LV power supply 530 is to provide power to the Boost Converter Control 515, while the main function of the second LV power supply 535 is to provide power to the Inverter Drive Oscillator 525 and Output Relay Control 565.

The first LV power supply 530 includes three inputs. As discussed above, the first LV power supply 530 receives, at the first input, a low voltage from the winding L104B of L104 in the Boost Converter. A start-up current is resistively supplied by the rectifier circuit to the second input of the first LV power supply. Auxiliary support current is also supplied from the second LV Power Supply to the first LV Power Supply at a third input.

As shown in FIG. 6, the first LV power supply 530 consists of five components. Capacitor C113, Resistor R112, rectifier diode D111 and Zener regulator diode D116 form a standard charge pump circuit. This provides enough energy for the electrolytic storage capacitor C117 to maintain an appropriate operating low voltage DC for the circuitry of the Boost Converter Control.

The second LV power supply 535 comprises six components. The charge pump supply is formed by five components: capacitors C103 and C107 rectifier diode D102, Zener regulator diode D110 and resistor R103. The charge pump requires the high voltage half-bridge to run so that the appropriate voltage can be developed and supplied to the other circuit blocks. The second LV power supply 535 sends power to the LV Power Supply 1 block via diode D105.

The boost converter control 515 processes the signals sensed from other blocks in the power supply. The boost converter control includes three inputs and one output. As shown in FIG. 6, the output of the boost converter control 535 comes from a L6561 integrated circuit controller IC1 through a resistor R114 to the gate lead input of the Boost Converter switch Fet transistor. The input from the first LV Power Supply, discussed above, feeds operating voltage to IC101. The input from the Bridge Rectifier uses resistor R111 as the lower end of the voltage divider and capacitor C114 as a noise filter. The signal produced from the sensing of the boost converter input lowers the voltage level and maintains the low frequency form appropriate for processing by the controller. The third input receives the three sense signals from the boost controller as discussed above. The first is the switch transistor current sense feedback voltage feeding the current sense input of IC101. The second uses precision resistors R115 and R139 as the lower end of the voltage divider formed in conjunction with previously mentioned R107. The signal produced feeds through a parallel combination of resistor RI51 and signal diode D123 for conditional feedback discrimination to the error amplifier within the controller. It also uses capacitor C136 to pole compensate the frequency response for feedback control, as well as capacitor C115 in series with resistor R152 across C136 to further vary the feedback compensation. Capacitor C139 couples feedback to the IC101 multiplier input to minimize the third harmonic contribution to THD, (total harmonic distortion). The third uses resistor R113 to limit the signal sense voltage from the 104B sense winding. This sense winding provides information to the controller about the state of the L104A winding, the boost inductor itself.

The controller IC101 is a standard Power Factor correction type controller for making the supply appear as a resistive load to the line. It also limits the total harmonic distortion of the line current so as to not strain the line system with noise and other obnoxious current waveforms. The IC101 pumps the appropriately timed switch signals to operate in the boost converter in critical conduction mode and achieve the benefits previously mentioned.

The inverter 520 is preferably a half bridge-inverter. The inverter has one main power input which is the boosted DC voltage output of the Boost Converter block and one main power output that drives the second filter 540. The half-bridge inverter also includes three output feeds that transmit three high voltage signals to other blocks. Two of these signals are used to drive charge pump circuits in the second LV Power Supply and the Output Relay Control. The third feeds the Half-Bridge Inverter Drive Oscillator. The inverter 520 also receives two inputs from the Inverter Drive Oscillator 525. These are signals for operating the half-bridge switch transistors. One has to be high voltage level shifted to drive the upper switch in the half-bridge. The other is low voltage and drives the lower ground referenced switch in the half-bridge.

As shown in FIG. 6, the inverter consists of five components. Two switch FET transistors TR101 and TR102 are configured in a typical half-bridge connection. DC blocking capacitors C105 and C106 are configured to provide a half-boost voltage center-tap reference for the half-bridge load. In addition, capacitor C120 is a Class Y safety noise bypass between chassis ground and the effective AC grounded center-tap of C105 and C106.

The inverter drive oscillator 525 includes a IR2153 high voltage integrated circuit IC102, which is basically a combination of an oscillator and a half-bridge driver. The high voltage integrated circuit IC102 feeds gate signals to the half-bridge FET transistors via resistors R104 and R105. The frequency of the half-bridge is set at IC102 via capacitor C101, resistor R102, and variable resistor R117. Adjustments of R117 also sets the value of constant output current, as well as tunes the open circuit output transient turn-on response. Blocking diode D112 and storage capacitor C109 isolate and filter the second LV Power Supply signal providing IC operating voltage. This voltage is Zener regulator diode D108 clamped and capacitor C138 high frequency bypassed. The level-shift capacitor C102 charges through diode D101 from the IC supply voltage during lower half of a switching cycle. The other components in the inverter drive oscillator include four resistors R124, R125, R136 and R145, Zener clamp diode D109, storage capacitor C111 and logic switch transistors TR106 and TR107 configured for low VAC input detection and IC102 shutdown.

The resonant filter 540 has one main power input from the Inverter 520, which is the half-bridge output voltage. The resonant filter 540 also has one main output to the first port output transformer across the resonant capacitance. The resonant filter 540, when adjusted to the optimal frequency, provides power to the first and second port output transformers. In addition, in the normal load range, the resonant filter removes the high frequency harmonics of the square wave generated by the half-bridge to the fundamental frequency sine wave component. The resonant filter 540 includes a resonant inductor L105 in series with a resonant capacitor C130. However, if the power supply is configured to be used with 120V input rather than a 277V input, the filter may alternatively be comprised of a resonant inductor L105 in series with four parallel-connected resonant capacitors C124, C125, C126, and C127, as shown in FIG. 6. The series resonant, parallel loaded connected filter AC grounds at the center-tap point of C105 and C106.

The first port output transformer 545 is comprised of a transformer TFR101. The transformer TFR101 has three windings. The filter output runs through the series connected primaries of the first and second port output transformers, thus feeding the second port output transformer. Primary transformer shutdown control is achieved by the input from the first port relay. Each port output transformer has two secondary windings. The first is a TFR101B sense winding for feeding a signal to the output relay control. The TFR101D second winding is the center-tapped port output. Since the output port winding is center-tapped and the center-tap is connected to chassis ground, either end of the winding produces a Bi-phase or balanced voltage.

The first port relay 550 includes a relay part RL101 across the TFR101A primary of TFR101 and coupled to the second port relay across the TRF102A primary of TRF102. It is activated via the output relay control. It also receives a signal from the output relay control 565 to short the primary of TFR101 that disables the first output port. This occurs only if conditions measured within the Output Relay Control block warrant port shutdown.

The second port output transformer reference is TFR102. Since it has a primary TFR102A in series with the TFR101 it shows a power input from the first port output transformer block. The two series connected primaries terminate at the same center-tap of C105 and C106 because the connection is in parallel with the resonant capacitance in the resonant filter block. The second port output secondary is TFR102D while the sense secondary is TFR102B. Although the second port output transformer and the first port output transformer are illustrated in FIG. 6 as being in series, the second output transformer may also be designed to be the same as the first port output transformer.

The second port relay 560 performs in a similar manner as the first port relay. The second port relay includes a relay part RL102 across the TFR102A primary of TFR102 and coupled to the first port relay across the TRF101A primary of TRF101. It is activated via the output relay control block. It also receives a signal to short the primary TFR102A of TFR102 that disables second output port, which occurs only if conditions measured within the output relay control block warrant port shutdown.

The output relay control 565 is responsible for monitoring the operation of the first and second ports. Both the first and second port transformer blocks 545 and 555 provide signals to the output relay control from sense windings that monitor output port voltage and therefore load conditions. The second LV power supply 535 provides low voltage power to the output relay control. The inverter 520 provides half-bridge output to a local charge pump, and a supply voltage reference to drive the relay control transistors and relay control windings. Both the first and second port relays 550 and 560 are then provided control signals from the output relay control block.

In one embodiment, the output relay control includes fifty-two components. A high frequency bypass capacitor C104 is provided on the second LV power supply rail, local to the relay control circuitry. The half-bridge output driven charge pump consists of capacitors C131, C132, C110 and rectifier diodes D104 and D110. This provides an appropriate voltage to run the two common-collector relay switch transistors, TR104 and TR105 and/or the relay control windings, with a provisional Zener diode D118 clamp in series with the upper control RL101A winding of relay RL101. Resistor R122 is a biasing resistor for TR104 and TR105. The output transformer sense windings TRF101B and TRF102B are diode D106 and D107 rectified and the signals are divided down with resistors R118, R119, R120, R121, R133 and R134 and clamped with Zener diodes D119 and D120. A small delay is then inserted consisting of resistors R137 and R138 and capacitors C133 and C134. These signals provide DC reference voltages representative of the load state of the output ports. Resistor R135, Zener regulator diode, D117 and high frequency bypass capacitor C123 are configured to create a simple reference voltage fed via resistors R143 and R144 for use in comparison with the port state DC reference voltages. A dual IC operational amplifier IC103 is used to process the comparison via either IC103A or IC103B, depending on the port. The differential amplifiers are control loop compensated with capacitors, C121 and C122. Diodes D113 and D114 are configured to latch the amplifier outputs high if the signal level goes high. Port DC references are fed to appropriate amplifiers via resistors R149 and R150. Two networks consisting of resistors R158 and R159 and diodes D121 and D122 couple the port DC reference voltages to the main reference. This allows transient clamping of the port DC reference voltages with respect to the common reference. The outputs of both amplifiers feed individual resistor dividers consisting of resistors R129, R130, R131 and R132 for scaling to buffer transistors TR109 and TR1010. Transistors TR109 and TR1010 are also biased with resistors R126, R127 and R123, R128, respectively. Transistor TR109 drives transistor, TR108 which controls the upper TR104 relay switch transistor state. It is also coupled through resistor R116. Transistor TR110 directly controls the lower TRI05 relay switch transistor state. When in proper load range, the relays are signaled to remain open. When out of load range, signals to the relays short the appropriate primary or primaries to extinguish one or both port outputs. This way a port can run normally even if the other is faulted. Strategic time constants implemented at each differential amplifier enable a response time, tuned for limiting port output in the required voltage and power ranges. It also limits the output transient response at power converter turn-on. A triggered shutdown state is latched till a cycle of input to the power supply can be performed.

In one embodiment, the component values used in the power supply in FIG. 6 are as detailed in Appendix A.

Figure 7:
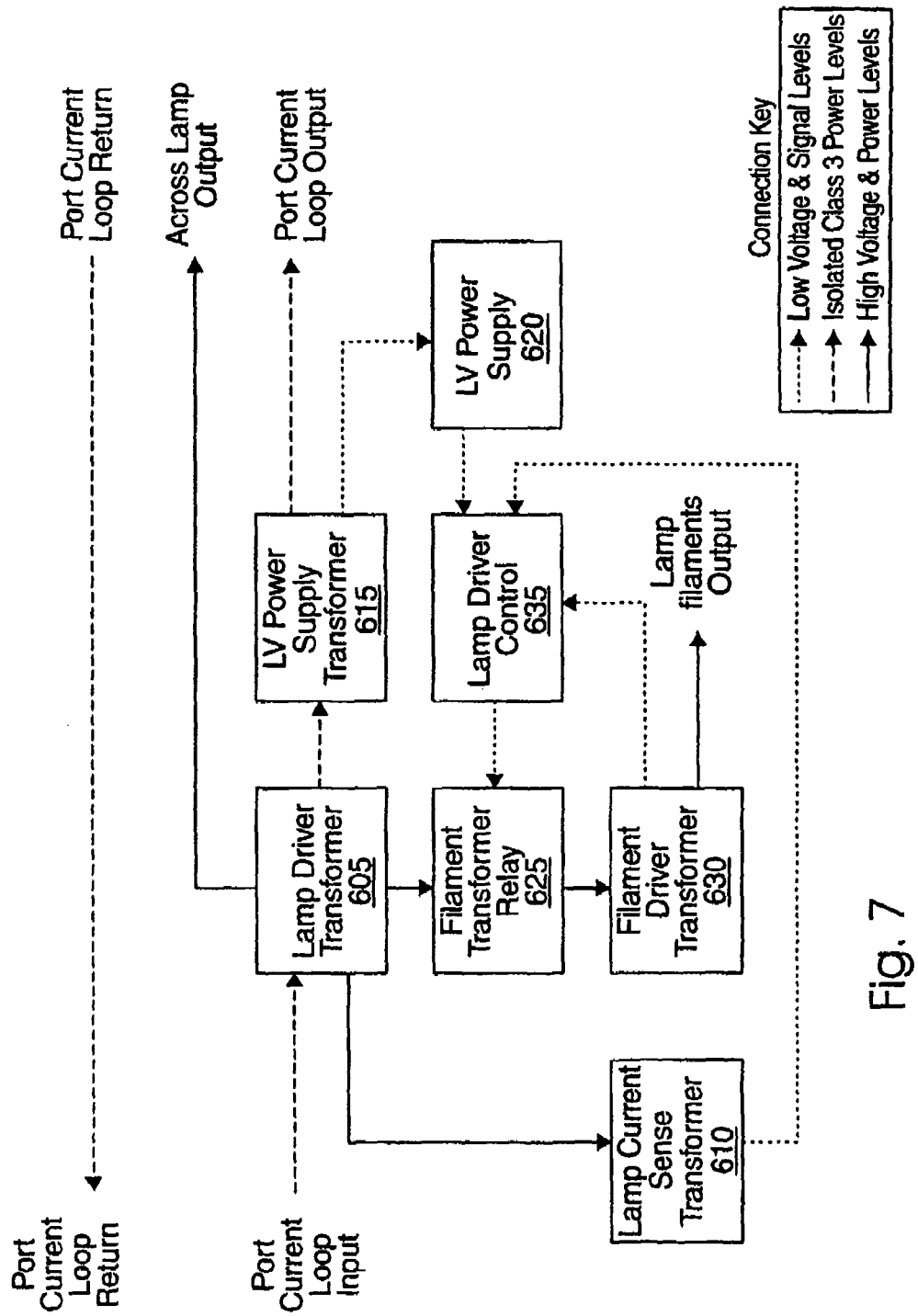
FIG. 7 is a block diagram of one embodiment of a single-lamp driver.
Figures 8, 8A:
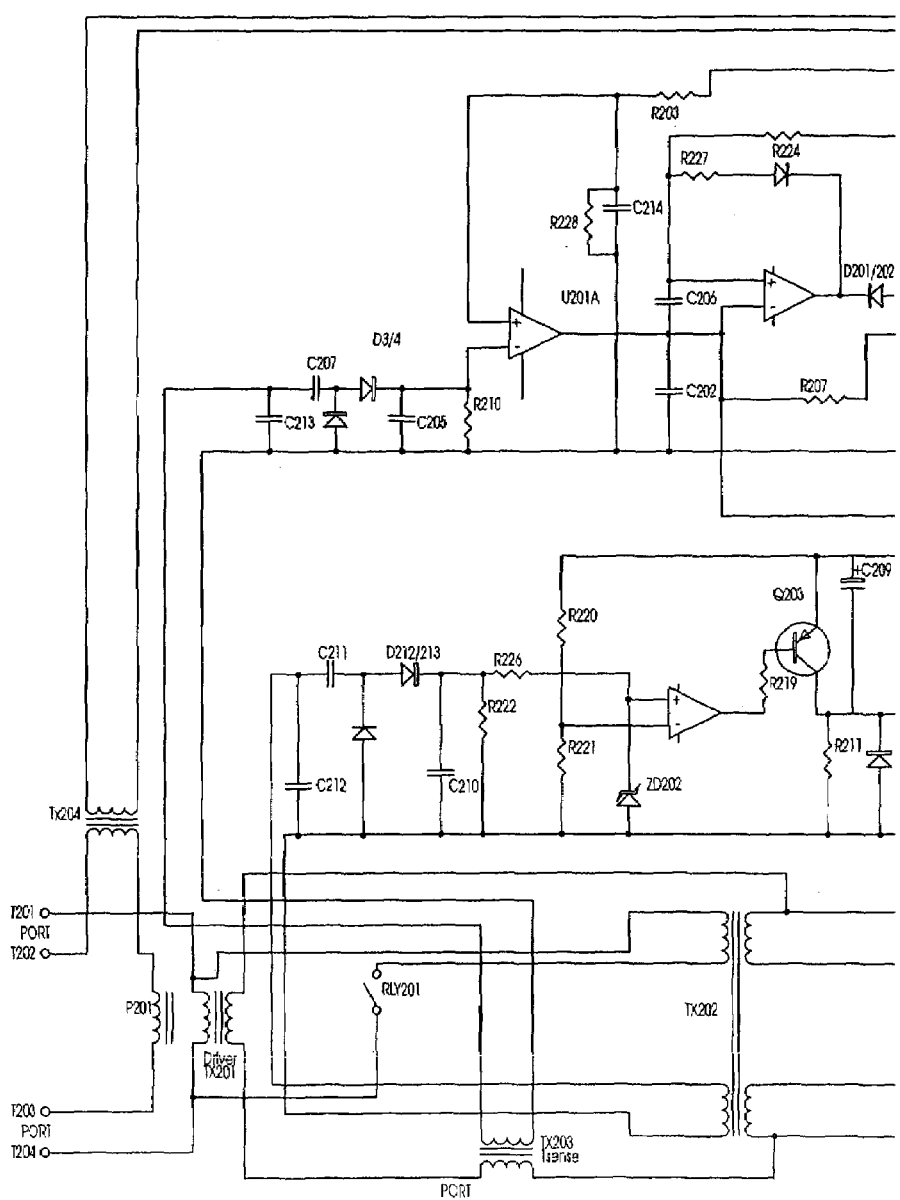
FIG. 8 is a circuit diagram of one embodiment of a single-lamp driver.
Figure 8B:
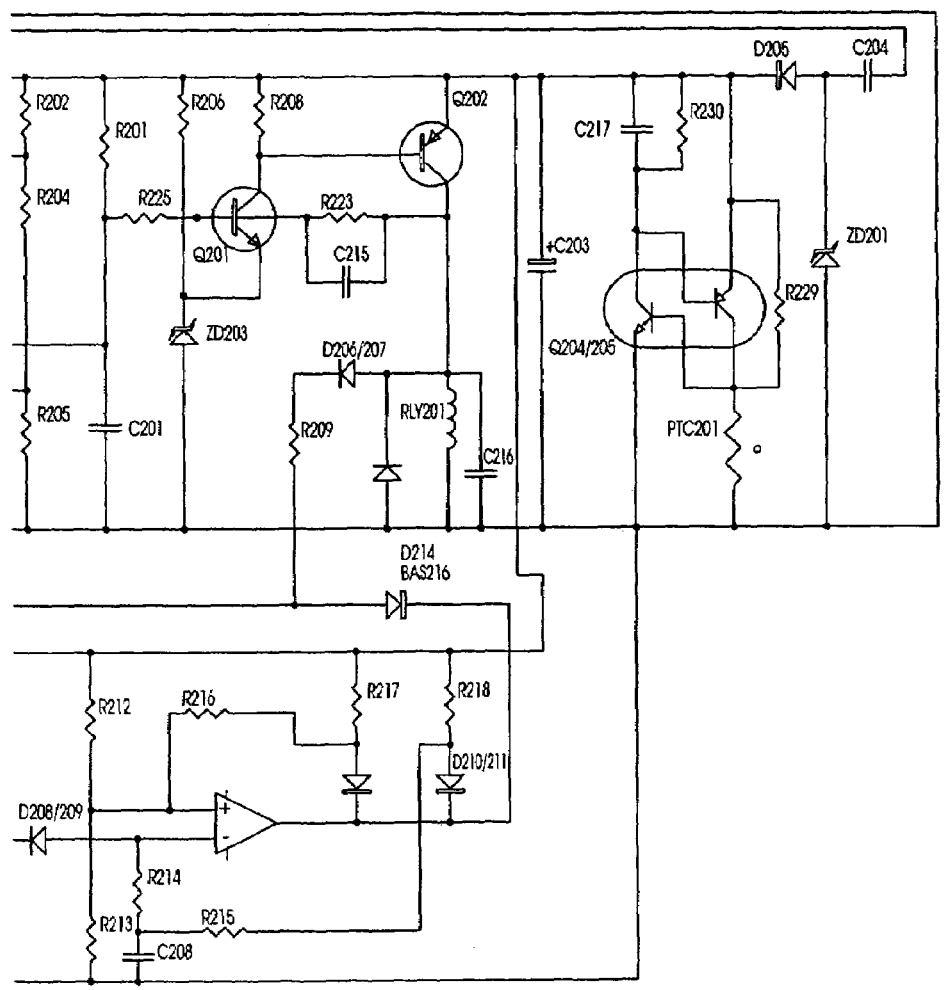

FIGS. 7 and 8 illustrate a block diagram and a circuit diagram, respectively, for one exemplary embodiment of a single-lamp driver. As shown in FIG. 7, the single-lamp driver 600 includes a lamp driver transformer 605, a lamp current sense transformer 610, and LV power supply transformer 615, an LV power supply 620, a filament transformer relay 625, a filament driver transformer 630, and a lamp driver control 635.

As shown in FIGS. 7 and 8, the loop current generally drives a pair of balanced primaries on the Lamp Driver Transformer 605 (TX201 in FIG. 8) in series with the primary of the LV Power Supply Transformer 615 (TX204 in FIG. 8). In parallel with the balanced primary windings of the Lamp Driver Transformer is the series connection of the primary of the Filament Driver Transformer 630 (TX202 in FIG. 8) and the switch of the Filament Transformer Relay 625 (RLY201 in FIG. 8). A return for the port loop current is provided since these designs offer a daisy chain connection option to another similar driver, or must be short circuit terminated.

As shown in FIG. 4, the short circuit termination may be accomplished via a terminator cap attached to the output port of the lamp driver when the lamp driver is not connected to any subsequent luminaires. Alternatively, each lamp driver may be capable of performing automatic short circuiting. For example, a port may remain short-circuited until the presence of a connected cable is detected. Such functionality may be performed either mechanically or electrically and eliminates the need for a separate terminator cap. In addition, an automatic short circuiting circuit may also be configured to allow a user to initiate a short circuit at a port even if that port is connected to another lamp in the series. As a result, any lamps downstream of the short-circuited port can be turned off without affecting the power delivered to lamps upstream of the short circuit.

The secondary of the lamp driver transformer TX201 is situated across the series connection of the Lamp Current Sense Transformer TX203 and the across lamp output. In this way switching of the relay to an open state at lamp ignition disables the filament drive and resets the lamp output for the proper voltage and current operation.

The lamp current sense transformer 610 enables establishment and detection of proper lamp functioning. As previously mentioned, the lamp output is series connected through the Lamp Current Sense Transformer TX203. The secondary of the current sense transformer signals the Lamp Driver Control 635.

The LV power supply transformer TX4 steps loop current to an appropriate value to operate the LV Power Supply and subsequent loads. Since its primary is in series with the loop current, it can be scaled to provide appropriate low voltage power to run the control circuitry. In one embodiment, the ratio of the primary to secondary turns are 8:88 for TX201, 1:3 for TX202, 6:1 for TX203 and 1:20 for TX204.

The LV power supply 620 consists of four components configured for charge pumping and energy storage. Capacitor C204, Zener diode, ZD201 and rectifier diode D205 connect to form the charge pump portion of the supply. Capacitor C203 stores energy and averages the rectified output of the charge pump. Capacitor C203 also provides voltages to operate the circuitry of the Lamp Driver Control block.

The input of the filament transformer relay RLY201 switches power from the loop current to the Filament Drive Transformer. The filament transformer relay RLY201 has one signal level input from the Lamp Driver Control and is set-up in the normally closed mode. When activated, it opens the filament transformer primary, eliminating the filament power delivery, as well as releasing its shorting of the balanced primary of the Lamp Driver Transformer.

The filament driver transformer 630 consists of three secondary windings. The primary winding connection was previously discussed. Two secondary windings provide filament heating current. This occurs only when the RLY201 relay is closed. The third winding provides feedback to the Lamp driver Control block.

Figure 9:
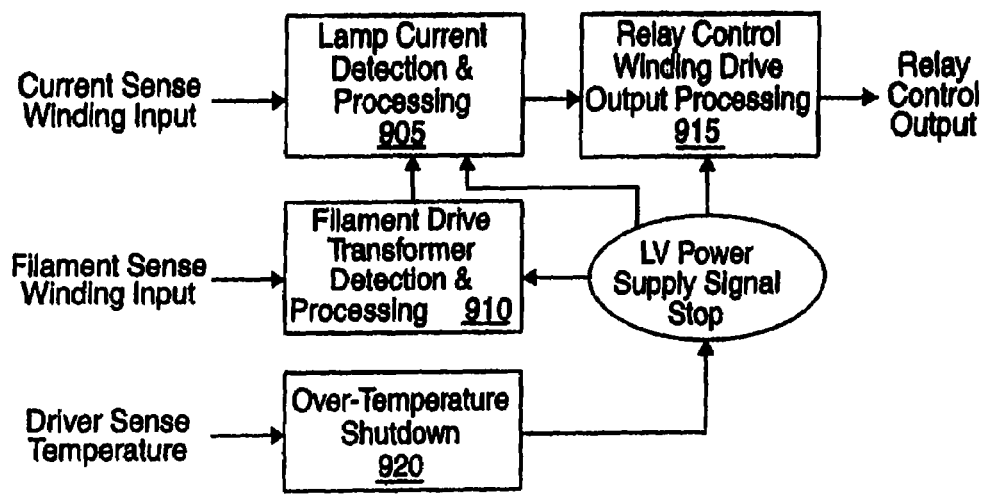
FIG. 9 is a block diagram of one embodiment of the lamp driver control.

The Lamp Driver Control 635 makes the interpretations about what state to assume based on lamp load, daisy chain, and any other design considerations. FIG. 9 illustrates a block diagram of one embodiment of the lamp driver control block. One component of the Lamp driver control is an integrated circuit U201 (shown in FIG. 8) which consists of four discrete comparator sections. The other components form a lamp current detection and processing circuit 905, a filament drive transformer detection and processing circuit 910, relay control winding drive output processing circuit 915, and over-temperature shutdown circuit 920.

The over-temperature shutdown circuit 920 controls the shutdown of the LV power supply 620 and consists of a positive temperature coefficient resistor PTC201, bias resistors R229 and R230, switch transistor pair Q204/205, and bypass capacitor C217. Simply, PTC201 monitors the ambient temperature within the driver. R229 and PTC201 form a voltage divider with respect to the LV Power Supply rail. It feeds the transistors of the Q204/205 pair, shorting the output of the LV Power Supply. Without a source of power the filament relay closes, disabling the lamp output.

The relay control winding drive output processing circuit 915 includes 12 components. The PNP transistor Q202 is responsible for directly sourcing holding current to the relay control winding. Capacitor C216 noise filters the relay control winding, along with half of the dual diode D206/207. Q202 is controlled by NPN transistor Q201. These transistors are both biased through resistor R208. Signaling to the base of Q201 is coupled through resistor R225. This resistor also feeds through a parallel combination of bias resistor R223 and speed-up capacitor C215 to stabilize the collector of Q202 and provide additional drive to open the relay. The time constant of resistor R201 and capacitor C201 determine the program starting time for filament heating. They also couple in at R225 and the output of the current sense detect section. The emitter of Q201 is level set via resistor R6 and Zener diode ZD203. Overall, the purpose of the relay control winding drive 915 is to provide current to activate the normally closed filament transformer relay. The current sense detection circuit directly controls that drive, while the filament detection resets a latch within the current detection to allow restarting of the control winding drive.

The filament drive transformer detection and processing circuit 910 is comprised of twenty four components. Load capacitor C212 is in parallel with the filament transformer detection secondary. A charge pump converter consisting of capacitor C211 and dual diode D212/213. Filter capacitor C210 and preload resistor R222 complete the formation of the lamp detection signal. The signal is then fed through resistor R226 to the non-inverting terminal of a single comparator section. This non-inverting input is clamped via Zener diode, ZD202. A voltage divider consisting of resistors R220 and R221 reference sets the associated inverting terminal of the same comparator section. The comparator output drives PNP transistor Q203 coupled through resistor R219. Timing capacitor C209 is across the emitter and collector terminals of Q203. Resistor R211 determines the rate at which C209 charges or discharges once Q203 is signaled to turn off or turn on, respectively. Dual diodes D208/209 are configured to prevent the voltage across R211 from extreme negative voltage excursions and allow a low signal at the collector of Q203 to control the next coupled comparator section. Resistors R212 and R213 are responsible for set-up of the reference voltage on the non-inverting pin of the pulse generator configuration of the second comparator section. This generator can signal the current sense detection and processing circuit latch through diode D214. Resistors R217 and R218, each in series with respective diodes of dual diode D210/211, act as bias sources for the comparator output. Feed forward through resistor, R216 from the non-inverting terminal to the junction of one bias network enables a two level variable reference point for hysteresis. This enables the other output bias network to charge through a time constant associated with resistor R215 and capacitor C208. The R215 and C208 network couples into the inverting pin of the comparator through resistor R214 enabling a low pulse on the generator output. This cycle repeats until Q203 is turned off long enough to charge C209, pulling the inverting input to a low state and preventing C208 from recharging. The overall function of this circuit is to reset a latch in the current detector section with a low pulse from the filament detect section. This occurs because C208 charges through R215 once the control winding drive turns on and opens the relay. After C208 charges, it triggers a pulse, restarting a turn on cycle in the relay control winding drive output. This will happen for a number of cycles allowed by the R211 and C209 time constant.

The current detection and processing 905 consists of eighteen parts. The functioning of capacitors C213, C207 and C205, dual diode D203/204, and resistor R210 is exactly the same as their counterparts described in the previous section. They create a signal representation of the lamp operating current. In a first comparator section, the non-inverting pin reference is set up via resistors R203 and R228 and filter capacitor C214. A second comparator section is a resettable latch. The output is coupled through one diode of the dual diode D201/202 to the R225 of the relay control driver. A resistor divider, resistors R202, R204 and R205, is used to couple through two signals to both the inverting and non-inverting terminals of the latch via resistors R207 and R224. This creates a window for the normal range of lamp current operation. Shutdown for the lamp end-of-life rectification mode is enabled by forcing the latch to set via the current transformer feedback winding and signal processing. Resistor R227 in series with the other diode of D201/202 feed the non-inverting signal to the output to insure latching of the output once it has gone low. Capacitors C206 and C202 are for noise filtering. Resistor R209 and the other diode of dual diode D206/207 are in series and can sense drive for the relay control winding, so that the relay can set the latch if the current in the lamp is not detected and the relay is open. As previously mentioned, this section directly controls the relay control winding drive output. The main latch has the power to signal close the relay if a lamp is removed during operation, a lamp fails for end-of-life rectification, a lamp was never present, or lastly, a lamp was present but does not start. It is only when the lamp is present, it starts, and it runs that the latch does not trigger.

In one embodiment, the component values used in the lamp driver in FIG. 8 are as detailed in Appendix B.

Figure 10:
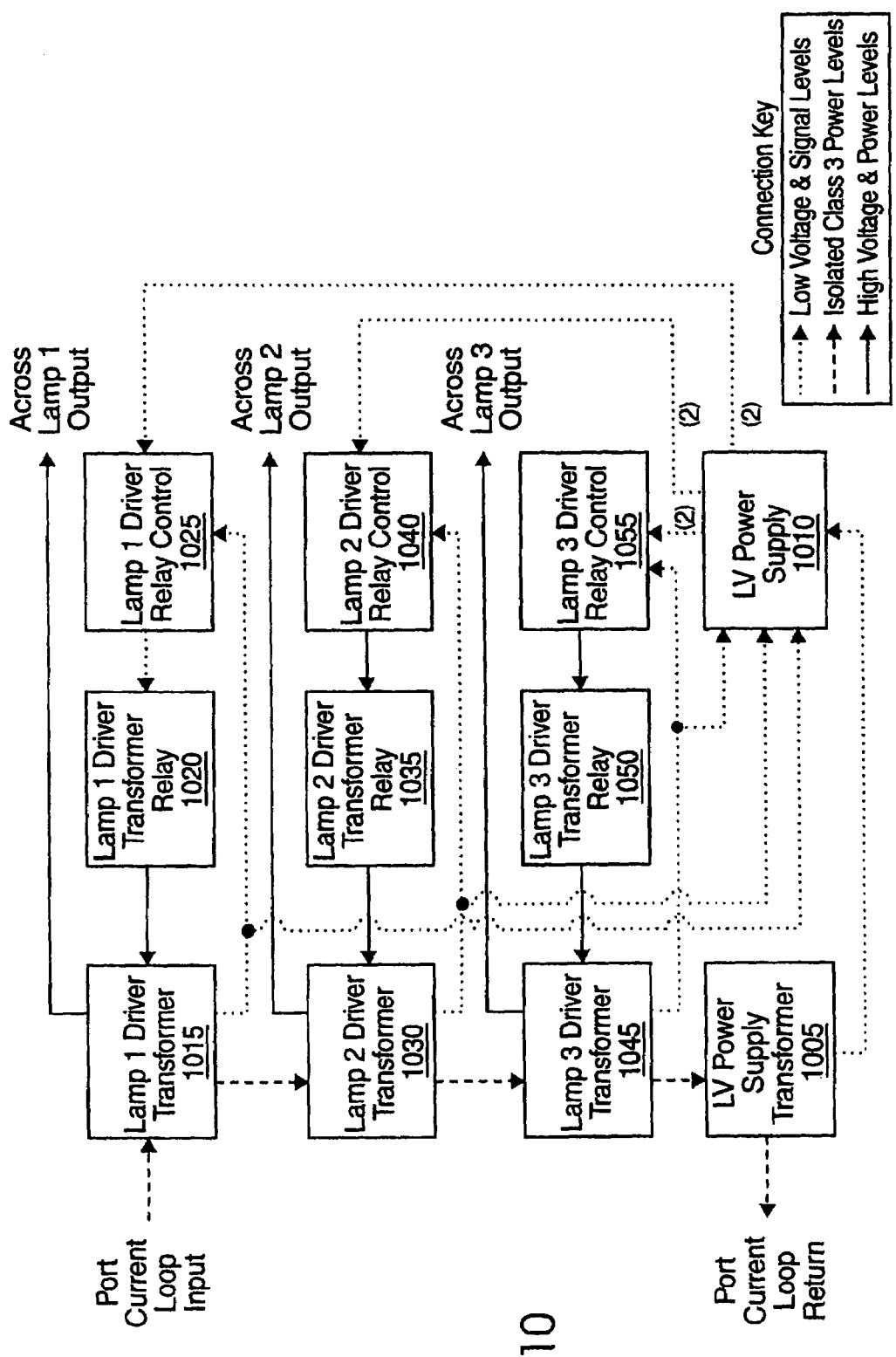
FIG. 10 is a block diagram of one embodiment of a three-lamp driver.
Figure 11B:
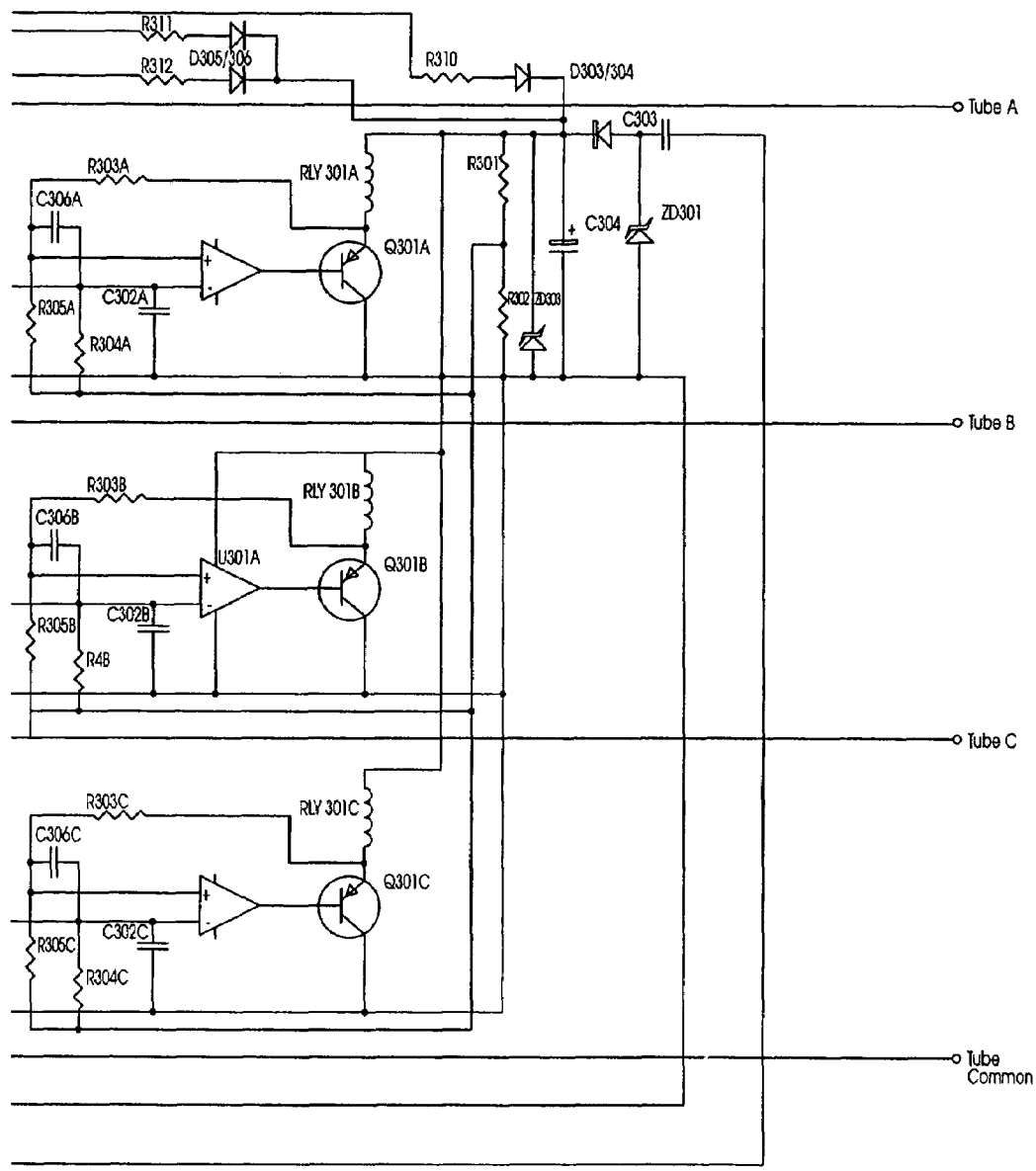
FIG. 11 is a circuit diagram of one embodiment of a three-lamp driver.

FIGS. 10 and 11 illustrate a block diagram and a circuit diagram, respectively, of one embodiment of a three-lamp driver 1000. The three-lamp driver includes a LV power supply transformer 1005, an LV power supply 1010, a first lamp driver transformer 1015, a first driver transformer relay 1020, a first driver relay control 1025, a second lamp driver transformer 1030, a second driver transformer relay 1035, a second driver relay control 1040, a third lamp driver transformer 1045, a third driver transformer relay 1050, and a third driver relay control 1055.

The LV Power Supply Transformer 1005 (TX302 in FIG. 11) has its primary in series with the primaries of the first lamp driver, the second lamp driver, and the third lamp driver transformers. Loop current runs through these primaries. The LV Power Supply transformer TX302 sends low voltage power to run the circuitry of the three Lamp Driver Relay Control blocks. In one embodiment, the primary to secondary turn ratio is 2:28.

The LV Power Supply 1010 receives input from the LV Power Supply Transformer 1005, the first lamp driver transformer 1015, the second lamp driver transformer 1030, and the third lamp driver transformer 1045. The LV Power Supply has three main outputs. Each output consists of two different voltage signals sent to each of the three sequential relay control blocks.

The LV Power Supply 1010 consists of eleven components. The first three are capacitor C303, half of a dual rectifier diode D303/304, and Zener diode ZD301 configured in a charge pump configuration. This feeds a small energy storage capacitor C304 setting up a low voltage power source to run the control circuitry of the relay control block. Resistor R310 is in series with the other half of the dual diode D303/304, feeding the LV Power Supply rail from the first lamp driver transformer sense winding. Resistors R311 and R312 are in series with each end of another dual rectifier diode D305/306. This network similarly feeds the LV Power Supply rail from the second lamp and the third lamp driver transformers, respectively. The last two components are resistors R301 and R302 which form a voltage divider to create a comparator reference signal for the first, second, and third lamp driver relay controls.

The first lamp driver transformer 1015 (TX301A in FIG. 11) has its primary in series with the primaries of the second lamp driver transformer 1030, the third lamp driver transformer 1045, and the LV power supply transformer. Loop current runs through these primaries. The first lamp driver transformer TX301A sends output to a first lamp via its main secondary winding. It also sends signals to the first lamp driver relay control 1025 and the LV power supply 1010 via an additional secondary winding. It receives a shutdown from the first lamp driver transformer relay 1020 in the form of a short-circuiting of the transformer primary winding. In one embodiment, the primary to secondary turn ratio of TX301A is 25:188.

The first lamp driver transformer relay 1020 has one signal input and one output. The input is a signal that allows the relay to remain open, or if necessary, closed. The output uses the relay switch to short the driver transformer primary, terminating the main secondary winding output to its associated lamp. This eliminates voltage availability at the lamp sockets, for safety during lamp-out and re-lamping situations.

The first lamp relay control 1025 has one main input and one main output. The input really consists of two signal inputs from the LV Power Supply block, as discussed above. The output feeds voltage to signal the control winding of the first lamp driver transformer relay. The output signals the relay to close if the lamp fails to ignite or if a lamp is removed during operation.

The first lamp relay control 1025 contains thirteen components, along with a comparator section that is part of integrated circuit U301. The U301 IC shares comparator sections with the second and third lamp driver relay controls, operating in each section in a hysteretic inverting mode. Resistors R308A and R309A divide down the sense signal from the driver transformer. It is followed by capacitor C301A and dual rectifier diode D301/302A configured as a charge pump to create a DC signal to detect lamp operation and/or lack thereof. The charge pump feeds resistors R306A and R307A in series, with a Zener diode clamp ZD302A across R306A, to the inverting comparator input. The signal there is noise filtered to ground, as well time constant set-up, by capacitor C302A. Differential mode noise is bypassed across the inverting and non-inverting comparator inputs by capacitor C306A. In addition, resistor R304A couples in the divided LV Power Supply reference signal from the LV Power Supply. The same divided reference signal is coupled to the non-inverting comparator input through resistor R305A along with hysteretic feedback resistor R303A. This comparator section controls the base of the PNP relay control winding drive transistor Q301A. The Q301A transistor is turned on when the comparator sinks current, enabling the relay control winding to signal a relay closure. Q301A also latches the comparator into the low state for the duration of driver operation. Cycling of the input loop current to the driver resets the comparator.

The second and third lamp driver transformers, transformer relays and relay controls function in a similar manner to those of the first lamp discussed above and serve to operate a second and third lamp, respectively. In FIG. 11, components that function similar to those discussed above for the first lamp are designated with the letter "B" for the second lamp, and "C" for the third lamp. For example, components Q301A, Q301B, and Q301C in FIG. 11 are part of the first lamp relay control, the second lamp relay control, and the third lamp relay control, respectively.

In one embodiment, the component values used in the lamp driver in FIG. 11 are as detailed in Appendix C.

Figure 12:
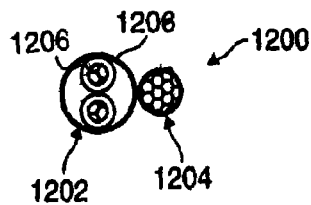
FIG. 12 is a cross section of one embodiment of a cable.

FIG. 12 illustrates one embodiment of a flexible cable 1200 that may be used to connect components of the present system. The flexible cable 1200 is preferably a plenum rated Class 3 cable. According to one aspect of the invention, the cable includes a first leg 1202 having an insulated non-polarized twisted pair of wires and a second leg having an insulated single wire or a strand of wires 1204, as shown in FIG. 12. In one embodiment, the twisted pair is 18 AWG bare copper and the insulated single wire is preferably 14 AWG bare copper wire.

The twisted pair is also preferably constructed to have a minimum of 1.27 twists/inch and a capacitance of 19+/−3 picofarads per foot.

In one embodiment, the insulation 1206 surrounding each strand of bare wires of the twisted pair of wires is comprised of Halar and has a thickness of 0.01 inches Nom. The first and second legs are also preferably provided with a common jacket 1208 having a narrow web 1210 between the first and second legs. In one embodiment, the common jacket has a thickness of 0.018 inches Nom.

While various embodiments of the application have been described, it will be apparent to those of ordinary skill in the art that many more embodiments and implementations are possible that are within the scope of this invention. For example, while the system described above is generally used with a constant current signal at a relatively constant frequency, it is noted that the frequency of the constant current signal need not be fixed. For example, the frequency may be changed during operation to provide dimming functionality. If the lamp driver includes a ballasting circuit, the frequency of the constant current signal may also be fluctuated to provide lamp ignition. Accordingly, the invention is not to be restricted except in light of the attached claims and their equivalent.

APPENDIX A

| | |
|---|---|
| R101 | 180 kΩ |
| R102 | 13 kΩ |
| R103 | 100 Ω |
| R104 | 10 Ω |
| R105 | 10 Ω |
| R106 | 1.2 MΩ |
| R107 | 1.2 MΩ |
| R108 | 1.2 MΩ |
| R109 | 68 kΩ |
| R110 | 68 kΩ |
| R111 | 12 kΩ |
| R112 | 47 Ω |
| R113 | 68 kΩ |
| R114 | 22 Ω |
| R115 | 7.51 kΩ |
| R116 | 7 kΩ |
| R117 | 4.7 kΩ |
| R118 | 150 kΩ |
| R119 | 150 kΩ |
| R120 | 43 kΩ |
| R121 | 43 kΩ |
| R122 | 10 kΩ |
| R123 | 10 kΩ |
| R124 | 10 kΩ |
| R125 | 10 kΩ |
| R126 | 10 kΩ |
| R127 | 10 kΩ |
| R128 | 10 kΩ |
| R129 | 1 kΩ |
| R130 | 1 kΩ |
| R131 | 9.1 kΩ |
| R132 | 9.1 kΩ |
| R133 | 1.8 kΩ |
| R134 | 1.8 kΩ |
| R135 | 1 kΩ |
| R136 | 1 kΩ |
| R137 | 22 kΩ |
| R138 | 22 kΩ |
| R139 | 51.1 Ω |
| R140 | 33 Ω |
| R141 | 33 Ω |
| R142 | 33 Ω |
| R143 | 38 kΩ |
| R144 | 68 kΩ |
| R145 | 8.2 kΩ |
| R146 | 8 kΩ |
| R147 | 8 kΩ |
| R148 | 8 kΩ |
| R149 | 10 kΩ |
| R150 | 10 kΩ |
| R151 | 75 kΩ |
| R152 | 120 kΩ |
| R153 | 27 Ω |
| R154 | 27 Ω |
| R155 | 27 Ω |
| R156 | 27 Ω |
| R157 | 4.7 Ω |
| R158 | 1 kΩ |
| R159 | 1 kΩ |
| C101 | 1 nF |
| C102 | 100 nF |
| C103 | 100 nF |
| C104 | 100 nF |
| C105 | 470 nF |
| C106 | 470 nF |
| C107 | 1.5 nF |
| C108 | 2.2 nF |
| C109 | 22 uF |
| C110 | 47 uF |
| C111 | 47 uF |
| C112 | 1 uF |
| C113 | 1.5 nF |
| C114 | 10 nF |
| C115 | 220 nF |
| C116 | 47 uF |
| C117 | 22 uF |
| C118 | 2.2 nF |
| C119 | 2.2 nF |
| C120 | 2.2 nF |

APPENDIX A-continued

| | |
|---|---|
| C121 | 100 nF |
| C122 | 100 nF |
| C123 | 10 nF |
| C124 | 4.7 nF |
| C125 | 4.7 nF |
| C126 | 4.7 nF |
| C127 | 4.7 nF |
| C128 | 470 nF |
| C129 | 2.2 nF |
| C130 | 15 nF |
| C131 | 1 nF |
| C132 | 1 nF |
| C133 | 1 uF |
| C134 | 1 uF |
| C135 | 1 uF |
| C136 | 1 nF |
| C137 | 220 pF |
| C138 | 100 nF |
| C139 | 100 nF |

APPENDIX B

| | |
|---|---|
| R201 | 3.3 MΩ |
| R202 | 33 kΩ |
| R203 | 2.2 MΩ |
| R204 | 22 kΩ |
| R205 | 22 kΩ |
| R206 | 33 kΩ |
| R207 | 1 MΩ |
| R208 | 22 kΩ |
| R209 | 100 kΩ |
| R210 | 100 kΩ |
| R211 | 1 MΩ |
| R212 | 2.2 MΩ |
| R213 | 2.2 MΩ |
| R214 | 2.2 MΩ |
| R215 | 10 kΩ |
| R216 | 1 MΩ |
| R217 | 100 kΩ |
| R218 | 1 MΩ |
| R219 | 47 kΩ |
| R220 | 100 kΩ |
| R221 | 39 kΩ |
| R222 | 1 MΩ |
| R223 | 10 MΩ |
| R224 | 1 MΩ |
| R225 | 2.2 MΩ |
| R226 | 15 kΩ |
| R227 | 220 kΩ |
| R228 | 1.5 MΩ |
| R229 | 100 kΩ |
| R230 | 5.1 kΩ |
| C201 | 1 uF |
| C202 | 330 nF |
| C203 | 10 uF |
| C204 | 33 nF |
| C205 | 100 nF |
| C206 | 1 nF |
| C207 | 33 nF |
| C208 | 1 uF |
| C209 | 10 uF |
| C210 | 470 nF |
| C211 | 3.3 nF |
| C212 | 0.47 uF |
| C213 | 0.1 uF |
| C214 | 470 nF |
| C215 | 470 pF |
| C216 | 10 nF |
| C217 | 10 nF |

APPENDIX C

| | |
|---|---|
| R301 | 10 kΩ |
| R302 | 8.2 kΩ |

APPENDIX C-continued

| | |
|---|---|
| R303A | 1 MΩ |
| R303B | 1 MΩ |
| R303C | 1 MΩ |
| R304A | 100 kΩ |
| R304B | 100 kΩ |
| R304B | 100 kΩ |
| R305A | 220 kΩ |
| R305B | 220 kΩ |
| R305C | 220 kΩ |
| R306A | 150 kΩ |
| R306B | 150 kΩ |
| R306C | 150 kΩ |
| R307A | 100 kΩ |
| R307B | 100 kΩ |
| R307B | 100 kΩ |
| R308A | 10 kΩ |
| R308B | 10 kΩ |
| R308C | 10 kΩ |
| R309A | 3.3 kΩ |
| R309B | 3.3 kΩ |
| R309C | 3.3 kΩ |
| R310 | 220 kΩ |
| R311 | 220 kΩ |
| R312 | 220 kΩ |
| C301A | 10 nF |
| C301B | 10 nF |
| C301C | 10 nF |
| C302A | 220 nF |
| C302B | 220 nF |
| C302C | 220 nF |
| C303 | 100 nF |
| C304 | 100 uF |
| C306A | 1 nF |
| C306B | 1 nF |
| C306C | 1 nF |

What is claimed is:

1. A flexible cable for a lighting system having a power supply and at least one luminaire, the power supply including a power supply input to receive a first signal having a first frequency and a circuit for converting the first signal to a second signal, and the at least one luminaire coupled to a lamp driver, the cable comprising:
   a first leg of wires for carrying the second signal having a first wire electrically connecting a loop output of the power supply to a loop input of the lamp driver and a second wire electrically connecting a loop output of the lamp driver to a loop return of the power supply; and
   a second leg of wires electrically connected to a ground of the power supply and a ground of the lamp driver wherein,
   the first wire and the second wire are insulated from one another, wherein the flexible cable further comprising a modular connector, and the second signal has substantially constant current and a second frequency of the second signal distinctly higher than the first frequency of the first signal.

2. The flexible cable of claim 1, wherein the second leg of wires comprises at least one uninsulated wire.

3. The flexible cable of claim 1, wherein the second frequency is approximately 48 kHz.

4. The flexible cable of claim 1, wherein the substantially constant current is between about 0.67 Arms and about 3.3 Arms.

5. The flexible cable of claim 1, wherein the substantially constant current is approximately 1.3 A rms.

6. The flexible cable of claim 1, wherein the second signal has a power factor greater than 0.98.

7. The flexible cable of claim 1, wherein the second signal has a bi-phase voltage.

8. The flexible cable of claim 2, wherein the first leg of wires and the uninsulated wire are housed only in a flexible jacket between the power supply and the lamp driver.

9. The flexible cable of claim 2, wherein the uninsulated wire is 14 AWG bare copper wire.

10. The flexible cable of claim 2, wherein the twisted pair of wires has a capacitance of approximately 19 picofarads per foot.

11. The flexible cable of claim 8, wherein the flexible jacket includes a narrow web portion to separate the first leg of wires from the uninsulated wire.

12. The flexible cable of claim 11, wherein a insulation surrounding the first leg having non-polarized twisted pair of wires is comprised of Halar.

13. The flexible cable of claim 11, wherein the narrow web portion has a thickness of approximately .018 inches nominal.

14. The flexible cable of claim 12, wherein the twisted pair has about 1.27 twists or more per inch.

15. The flexible cable of claim 12, wherein the insulation has a thickness of 0.01 inches nominal.

16. The flexible cable of claim 12, wherein the twisted pair of wires is 18 AWG bare copper wire.

17. The flexible cable of claim 14, wherein the insulation surrounding the first leg of wires is comprised of Halar.

18. The flexible cable of claim 14, wherein the twisted pair has about 1.27 twists per inch or greater.

19. The flexible cable of claim 14, wherein the twisted pair of wires is 18 AWG bare copper wire.

20. The flexible cable of claim 19, wherein the uninsulated wire is 14 AWG bare copper wire.

* * * * *